No. 663,092. Patented Dec. 4, 1900.
H. HILL.
THREADING TOOL.
(Application filed Jan. 15, 1900.)
(No Model.)
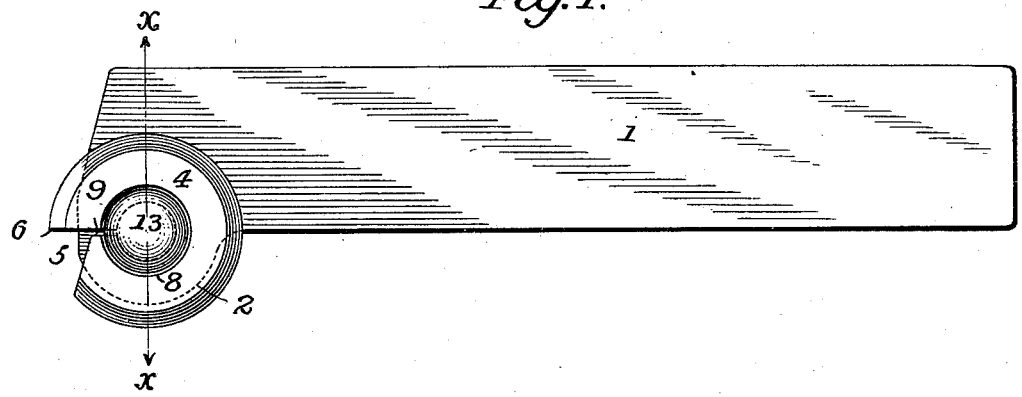
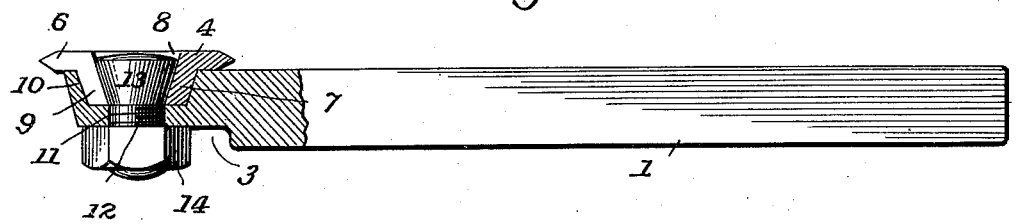
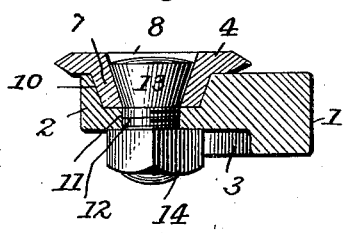
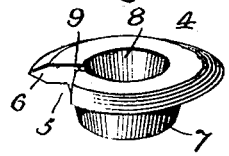
Witnesses
Inventor
Hugh Hill
by
Attorneys

UNITED STATES PATENT OFFICE.

HUGH HILL, OF ANDERSON, INDIANA.

THREADING-TOOL.

SPECIFICATION forming part of Letters Patent No. 663,092, dated December 4, 1900.

Application filed January 15, 1900. Serial No. 1,488. (No model.)

*To all whom it may concern:*

Be it known that I, HUGH HILL, a citizen of the United States, residing at Anderson, in the county of Madison and State of Indiana, have invented certain new and useful Improvements in Threading-Tools, of which the following is a specification.

This invention relates to improvements in circular notched cutters for planers, lathes, and similar machines; and its object is to so construct the cutter and holder therefor that the cutter may be firmly secured to the holder and the latter will not in any manner interfere with the cutting action of the former.

The invention will be fully described hereinafter, reference being had to the accompanying drawings, in which—

Figure 1 is a plan view of a cutter and holder constructed in accordance with my invention. Fig. 2 is a side elevation, partly in section; Fig. 3, a section on the line $x\,x$ of Fig. 1; Fig. 4, a perspective view of the cutter detached.

The holder consists of a bar 1, provided with a lateral projection 2 at the end, to which the cutter is attached. Preferably this projection and a portion of the bar adjacent thereto will be cut away, as indicated at 3, to form a recess, for a purpose to be referred to hereinafter.

The cutter is indicated by 4 and consists of the usual circular plate, with a notch or recess 5, one edge of which forms the cutting-bit 6. The periphery of the cutter may be of any desired shape to adapt it to the work required, and, as shown, it is of a form suitable to cut threads. From the lower face of the plate a tapering shank 7 projects, and the plate and shank are provided centrally with a tapered bore 8. The plate and shank are also slit or slotted, as indicated at 9, said slit preferably extending from the angle of the notch 5 to the bore, although it may be formed at any other point. A tapered recess or seat 10 is formed partly in the bar 1 and partly in the projection 2 to receive the shank 7 of the cutter, and an opening 11 extends through the bar and projection from the bottom of the recess, centrally of the latter, to receive the threaded securing-bolt 12, the tapered head 13 of which fits within the tapered bore 8 of the cutter. A nut 14 on the bolt bears against the lower face of the bar and projection and when tightened up securely clamps the cuttee in its seat. It will be observed that the nut is partly within the recess 3 and projects beyond the face of the bar 1 to about the same extent as the cutter projects beyond the opposite face of the bar, and the tool thus presents a very neat appearance and is evenly balanced.

One of the most important features of my invention is the slot or slit 9 in the cutter, as this permits the shank 7 to expand as the bolt is drawn tight, and thereby adjust itself to the seat in the holder. Furthermore, the edges of the slot 9 in the shank tend to bite into the face of the seat and greatly aid the friction between the shank and seat to prevent the cutter from turning on the holder when at work. With this construction the cutter can always be clamped tightly to the holder even after the parts have become considerably worn.

By providing the lateral extension 2 on the bar 1 I am enabled to have the center of the bearing of the cutter in line with the face of the bar from which the extension projects, as clearly shown in Fig. 1, and as the edge of the notch which forms the cutting-bit is also preferably in the same line it will be seen that the full width of the bar 1 is utilized to offer direct resistance to the pressure imposed upon the cutter when at work and a very rigid support for the cutter is thereby provided.

Having thus described the invention, I claim—

1. A bar having a lateral extension at one end and provided with a tapered recess partly in the extension and partly in the bar, and a bolt-hole extending centrally from the bottom of said recess, said bar and extension being partly cut away on one face to form a recess 3, combined with a circular cutter fitting against the face of the bar opposite that having the recess 3 and having a tapered shank to seat in the tapered recess, said shank having a central tapered bore registering with said bolt-hole, a bolt extending through said bolt-hole and having a tapered head fitting in the tapered bore of the shank, and a nut on the bolt engaging the bottom of the recess 3, and projecting beyond the face of the bar, substantially as and for the purpose set forth.

2. A holder provided with a tapered recess and a bolt-hole extending centrally therefrom, combined with a cutter having a slitted tapered shank fitting within said recess, said shank having a central tapered bore registering with said bolt-hole, a bolt extending through said hole and having a tapered head fitting in said tapered bore, and a nut on the bolt adapted to draw the tapered head within the tapered bore and expand the shank within its seat, substantially as set forth.

3. A holder provided with a tapered recess and a bolt-hole extending centrally therefrom, combined with a notched circular cutter provided with a tapered shank to seat in said recess, said cutter and shank being slitted, and the shank having a central, tapered bore, a bolt extending through said hole and having a tapered head fitting within the tapered bore of the shank, and a nut on the bolt adapted to engage the holder and draw the head within the bore to expand the shank within its seat, substantially as set forth.

In testimony whereof I have signed my name to this specification in the presence of two subscribing witnesses.

HUGH HILL.

Witnesses:
C. A. MARTINDALE,
EARL REEVE.